Dec. 11, 1956 G. H. TOWNER 2,774,026
DIGITAL SERVOMOTOR
Filed July 31, 1953 2 Sheets-Sheet 1

INVENTOR:
George H. Towner
By Herbert E. McLead
His Patent Attorneys

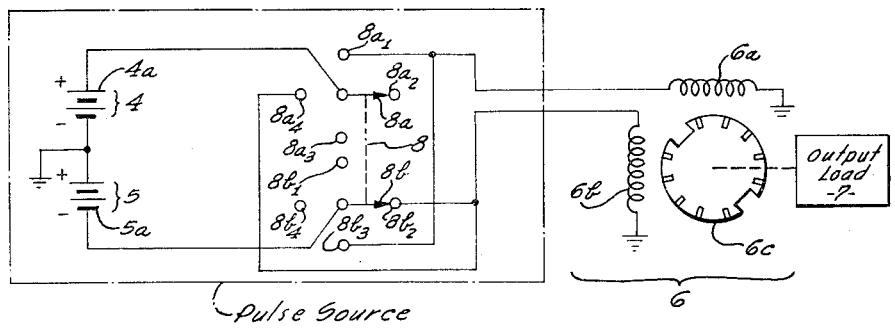
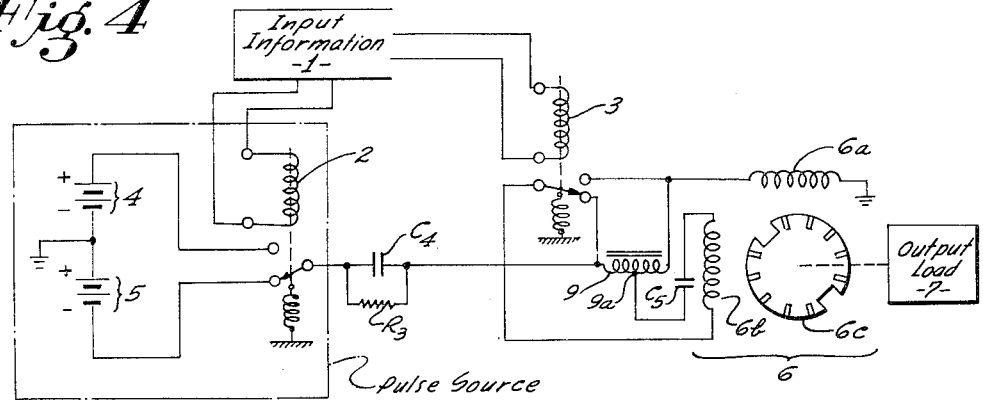
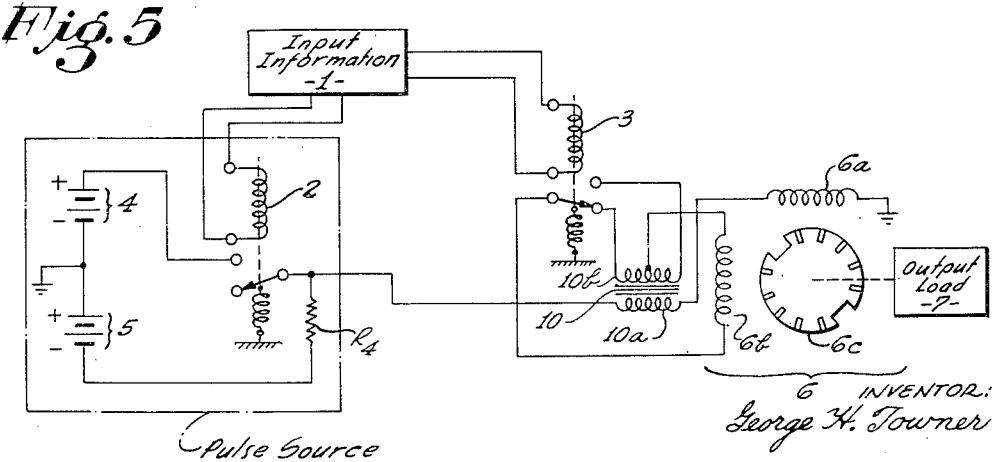

United States Patent Office 2,774,026
Patented Dec. 11, 1956.

2,774,026
DIGITAL SERVOMOTOR

George H. Towner, San Diego, Calif., assignor to Northrop Aircraft, Inc., Hawthorne, Calif., a corporation of California Application July 31, 1953, Serial No. 371,625

5 Claims. (Cl. 318—283)

The present invention relates generally to servomotors and more particularly to a servomotor system wherein the motor can operate in discrete and finite steps, i. e., an incremental, digital servomotor.

An object of this invention is to provide a servomotor which responds to a pulse input with a single rotation of output shaft, or a certain fraction thereof such as one half of a turn, a quarter turn, etc., for example, for each input pulse to the motor.

Another object of this invention is to provide a servomotor in which the rotor assumes an accurate and definite position with respect to the stator following each rotor rotation. For example, the rotor can rotate a single turn and stop precisely in the same position as before for each input pulse.

Another object of the invention is to provide a servomotor in which a locking action occurs between stator and rotor when the rotor is properly oriented, to establish an accurate stop position.

A further object of this invention is to provide a servomotor in which damping of rotor motion is provided to prevent rotor oscillations.

A still further object of the invention is to provide a digital servomotor which is simple and conventional of construction, thus making such a device readily available.

The foregoing and other objects are preferably accomplished, in short, by providing a source of D. C. power, a two phase servomotor for example, of a preferred construction for digital operation and switching means connecting the D. C. power source to the servomotor. The switching means are controlled and operated in accordance with prevailing input information to produce from the D. C. power source a pulse input and to apply each pulse to the servomotor in the proper polarity for each phase. Each pulse will cause the servomotor to make, in the correct direction, one revolution of output shaft, or certain fraction thereof, depending usually upon the structural construction of the servomotor. A preferred servomotor construction can be one similar to a simple two phase motor wherein the two phase windings are wound on the stator for at least one pair of poles. The rotor, however, can be preferably constructed from ferromagnetic alloyed sheets stacked to form a laminated permanent magnet rotor haviing salient poles. The number of poles, of course, corresponds to the number wound for on the stator. A plurality of slots are provided on the faces of the poles parallel to the rotation axis to accommodate copper or aluminum bars, for example, which are short circuited together by a ring of the same material at each end to provide closed damping (and torque producing) windings.

Other objects and features will be set forth in the following description of a preferred embodiment of the invention, and the invention will be more fully understood by reference to the attached drawings, in which:

Figure 3 is a circuit diagram of the invention in a simplified circuit.

Figure 4 is a circuit diagram of a digital servomotor wherein a reactance coil is employed to provide coupling to a servomotor.

Figure 5 is a circuit diagram of another digital servomotor wherein a transformer is utilized to connect a pulse source to a servomotor.

Figure 1:
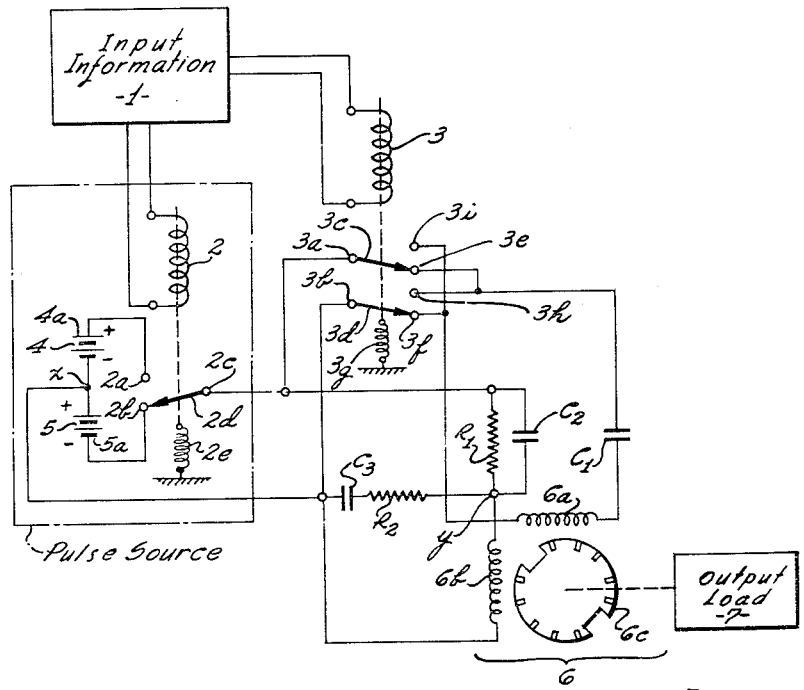
Figure 1 is a schematic diagram of a digital servomotor illustrating a preferred embodiment of the present invention.

Referring to Figure 1, a block 1 represents a source of input information and can be, for example, an electronic digital computer. The output channels of this source provide information signals which can govern the behavior of two relays, 2 and 3, for example. Relay 2 is a single pole, two position switching device and relay 3 is a double pole, two position switching device, as shown.

A D. C. power source can be comprised of a battery 4 connected in series with a battery 5, for example. Terminal 2a of relay 2 is connected to a positive plate 4a of battery 4 and terminal 2b of relay 2 is connected to a negative plate 5a of battery 5. Terminal 2c of relay 2 is directly connected to a pole 2d which is normally held in contact with terminal 2b by a spring 2e. Terminal 2c is also connected to a first terminal 3a of relay 3 and a second terminal 3b is connected to junction point x. Terminals 3a and 3b are directly connected to respective poles 3c and 3d which are ganged together and normally held in contact with terminals 3e and 3f, respectively, by a spring 3g. The terminals 3h and 3i are connected in parallel with terminals 3e and 3f, respectively.

Terminals 3e and 3h are connected to a capacitance $C_1$ which is serially connected to stator winding 6a of servomotor 6. This winding 6a is connected back to terminals 3f and 3i of relay 3.

Terminal 2c is further connected to a parallel resistance $R_1$ and capacitance $C_2$ combination which is connected in series with a stator winding 6b of servomotor 6. Stator winding 6b is placed 90 degrees apart from winding 6a. This winding, 6b, is connected back to the common junction $x$ of serially connected batteries 4 and 5. An isolating resistance $R_2$ in series with the capacitance $C_3$ can be connected from the $R_1$-$C_2$ combination and stator winding 6b junction point $y$ to the battery junction point $x$.

Rotor 6c of servomotor 6 is schematically shown as having two salient poles. The rotor 6c can be mechanically coupled to drive an output load 7.

Figure 2:
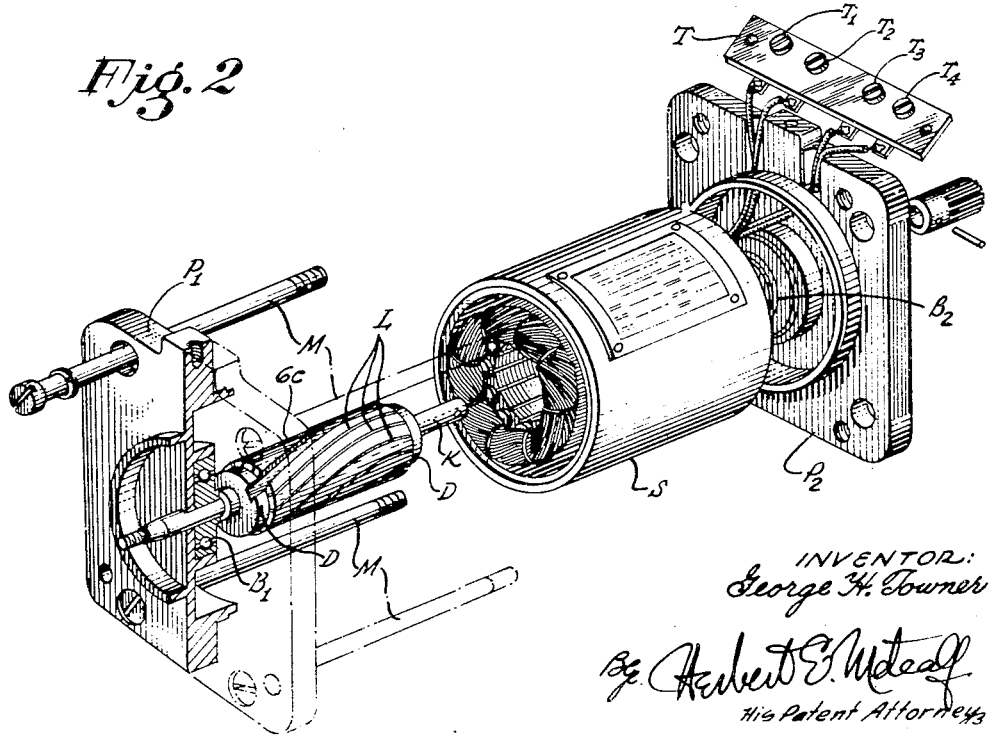
Figure 2 is a semi-exploded view of a preferred servomotor for digital operation.

Referring now to Figure 2 there is illustrated a preferred servomotor for digital operation in a partially exploded view. The construction is fairly conventional as may be noted. The several separated parts shown are two end plates $P_1$ and $P_2$, stator S and rotor 6c. The stator S is fabricated of laminated steel stampings having a number of parallel slots wherein the two phase windings 6a and 6b (see Figure 1) are wound for two poles, for example. The ends of these windings are brought out to a terminal strip T having four terminals $T_1$, $T_2$, $T_3$, and $T_4$ to which a pulse input can be applied.

The rotor 6c is also assembled from laminated steel stampings which have, however, been alloyed with material such as nickel to form a strong, permanently magnetized rotor preferably having salient poles. A D. C. magnetizing winding and slip rings could be used for magnetizing an ordinary steel rotor in lieu of a permanent magnet rotor. Slots L are provided on the pole faces of rotor 6c to accommodate a damping winding formed of copper or aluminum bars shorted together by end rings D of the same material. These slots L are preferably skewed and for this reason it is generally convenient and economical to form the damping windings and end rings D by pouring molten aluminum into the slots of the assembled laminated rotor core structure and into cups at each end to form the bars and shorting end rings. The entire rotor can be machined to tolerances upon cooling.

It should be noted that the salient pole rotor $6c$ can be fabricated from material which does not become permanently magnetized, for example, ordinary steel laminations. A D. C. magnetizing winding is not necessary with such a rotor when it carries a shorted, damping winding. The output torque in this case is somewhat less and there can be two stable positions which are separated by 180 degrees. One of the stable positions is consistently assumed in normal operation except on overload, then the rotor may stop in the other stable position.

End plates $P_1$ and $P_2$ each provide a seat for bearings $B_1$ and $B_2$ which are provided to support rotor $6c$ at each end of the rotor shaft K. The whole motor assembly is fastened together by plates $P_1$ and $P_2$ which are secured by four screws M.

The operation of the digital servomotor is simple. All that is necessary is a pulse source which can drive the servomotor. The pulse source can conceivably be an electronic digital computer itself, however, the pulse rate would presently be limited to 50 pulses per second, for example. In certain cases, mechanical actuation of pole $2d$ (Figure 1) is desirable as in the example of a perforated tape readout unit wherein the tape carries information via a series of punched holes and a micro-switch (for each channel) is operated by a feeler arm each time it senses (falls into and out of) a punched hole.

In Figure 1, each information pulse from source 1 is used to energize relay 2 momentarily and thus cause pole $2d$ to make contact with terminal $2a$ connecting with the positive plate $4a$ of battery 4. The pulse duration can be $\frac{1}{60}$ second, for example, and the result is, from terminal $2c$, a positive pulse (50 volts, for example) output which is applied to the two stator windings $6a$ and $6b$ of servomotor 6. Capacitance $C_1$ (10 mfd. for example) provides a transient pulse of applied voltage to winding $6a$. The parallel $R_1$-$C_2$ combination is employed to minimize the flow of current when pole $2d$ is in normal contact with terminal $2b$ and to permit easy (unaltered) pulse transmission whenever a pulse is applied to servomotor winding $6b$. Capacitance $C_2$ is relatively large for this reason although capacitance $C_3$ (in series with $R_2$) shunting the winding $6b$ can largely counteract any undesirable effect of $C_2$. Resistance $R_1$ limits the flow of locking current which provides a restoring force that maintains the rotor in a certain position when pole $2d$ is in contact with terminal $2b$. A small locking current is desirable when the control pulses are widely separated. Interaction of the two fields due to windings $6a$ and $6b$ on application of the positive pulse by actuating relay 2, however, causes the rotor to make a single revolution which is actually accomplished in two half turn steps. The rotor responds to the rise or the fall of a pulse (of any width greater than the necessary minimum) and comes to a stop in the same position without hunting because damping is provided by the short circuited pole face windings. The salient poles also provide a "detent" action when the rotor is correctly oriented.

The direction of rotor rotation is controlled by relay 3 which can be energized by input pulses put out by another channel in information source 1. The action of relay 3 is simply to reverse the leads connecting with stator winding $6a$ before a pulse is produced by relay 2.

Although the invention has been described wherein a double pole, two position relay has been employed to reverse the direction of output shaft rotation, it is equally feasible to provide a servomotor having stator windings with center taps. Thus, a single pole, two position switching device can be utilized in this instance to control the direction of rotation if desired, since, for example, the center tap of direction winding $6a$ can be connected through capacitance $C_1$ to junction point $x$ (Figure 1) and a single pole switch connected to terminal $2c$ can connect with either end of the split stator winding for reversal of output shaft rotation direction.

The circuit of Figure 3 shows a servomotor 6 connected to a D. C. power source, consisting of the batteries 4 and 5, through a double pole, multiple position switch 8. Switch 8 can be manually operated, for example, to actuate the servomotor 6. As can be observed from Figure 3, junction point $x$ of the serially connected batteries 4 and 5 is grounded as are the ends of servomotor windings $6a$ and $6b$. This part is essentially the same hookup of Figure 1. Positive plate $4a$ of battery 4 is connected to the pole $8a$ and negative plate $5a$ of battery 5 is connected to the pole $8b$ of switch 8. Terminals $8a_1$ and $8b_3$ are connected together to the ungrounded end of winding $6a$ and terminals $8b_2$ and $8a_4$ are connected together to the ungrounded end of winding $6b$, as shown. A parallel resistance-capacitance combination can be connected in series with each of the windings $6a$ and $6b$, the purpose being to cut down the magnitude of the locking current flowing in that winding. These R-C combinations which can be inserted in series with the windings are not absolutely necessary and have not been shown in this figure. Small capacitances (not shown) are also generally connected across windings $6a$ and $6b$ to reduce sparking at switch 8.

Operation of switch 8 (Figure 3) for each terminal position produces a current alternately in each stator winding which causes salient pole rotor $6c$ to follow, in steps, the motion of the switch poles. The sudden change of current causes the initial rotor motion when the rotor $6c$ is not permanently magnetized but carries damping windings. The steady state current, when the switch is not rotating, serves as a locking current. The rotor $6c$ for example would make four quarter turns for each complete rotation of the poles of switch 8. Reversing the direction of switch rotation will reverse the direction of rotor $6c$ movement. The switch 8 can be of the shorting type, that is, a pole can make contact with two adjacent terminals during switching. For example, pole $8a$ would be making contact with both terminals $8a_1$ and $8a_2$ when pole $8a$ has traveled halfway from terminal $8a_1$ to $8a_2$. With this type of switch, rotor $6c$ can make eight steps of one eighth turn each for a complete rotation of poles of switch 8. It is to be noted that rotor $6c$ is preferably a permanently magnetized rotor or one which can be magnetized by a D. C. winding thereon. Rotor $6c$ can be a non-magnetized salient pole rotor and preferably one with a squirrel cage damping winding at each pole.

The circuit of Figure 4 illustrates another embodiment of the present invention. In this figure, the pulse source is connected to a capacitance $C_4$ which has resistance $R_3$ connected in parallel with it, this combination being connected in series with a reactance coil 9 having a center tap $9a$. Reactance coil 9 is the coupling means which connects with both stator windings of servomotor 6. The center tap $9a$ can be connected to stator winding $6b$ through capacitance $C_5$ (which is not absolutely required) and stator winding $6a$ can be connected in series with reactance coil 9 and grounded, as shown. Relay 3 controls the direction of rotor rotation as before (Figure 1), however, only one pole is necessary which is shown connected to stator winding $6b$. The two position terminals of this pole is connected across the reactance coil 9 as shown. The parallel $R_3$-$C_4$ combination can be omitted from the circuit but this would permit a large, constant current drain from battery 5 to winding $6a$. If capacitance $C_4$ alone is used, the circuit is very efficient, however, there is no "detent" action. Thus, resistance $R_3$ is added to provide the desired "detent" action and to limit current drain when relay 2 is quiescent, i. e., not energized.

Reactance coil 9 is connected like an autotransformer. In Figure 5 a transformer 10 replaces reactance coil 9, primary winding $10a$ being connected as coil 9 was. Secondary winding 10b is connected to the two position terminals of relay 3 and the secondary center tap is connected in series with stator winding 6b, which is connected back to the pole of relay 3, as before. Since the secondary 10b is not directly connected with the primary winding 10a, a component of the locking current does not flow in stator winding 6b. Capacitance C5 (of Figure 4) is omitted from Figure 5 because of this fact. Then, by connecting resistance R4 directly to battery 5, as shown, instead of through the relay 2, resistance R4 only limits the locking current which flows through stator winding 6a when relay 2 is not energized. Thus, resistance R4 does not restrict the motivating current flow from battery 4 when relay 2 is energized. With R4 in the circuit relay 2 can be a single pole, single throw relay instead of a single pole, double throw relay.

Multiple pole servomotors fabricated in like manner as the two pole example of Figure 2 can be used in place of servomotor 6 (Figure 1) to provide means which can rotate in discrete and finite fractions of a turn for each input pulse. When a permanently magnetized rotor is used, a salient pole rotor is preferable although not essential.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A digital servomotor, comprising: a two phase servomotor responsive to a pulse input thereto by a discrete and finite amount of output shaft rotation for each input pulse, one of the phase windings having a capacitance connected in series therewith to provide a transient pulse of input voltage applied thereto; a first and a second D. C. power source, said D. C. power sources connected serially in additive polarity; a single pole, two position relay operable by external input information signals, said serially connected first and second power sources connected across the two position terminals of said single pole, two position relay, the pole of said single pole relay being actuated by said input information signals momentarily from a normal position terminal to the other position terminal and back to produce a pulse output of sufficient magnitude and width to drive said servomotor; a parallel resistance-capacitance combination connected in series with the other phase winding of said two phase servomotor, one end of said latter series combination connected to the pole of said single pole relay, the other end being connected to the common junction of said serially connected first and second power sources, said parallel resistance-capacitance combination limiting the rotor locking current through said other phase winding when the pole of said single pole, two position relay is on said normal position terminal; and a double pole, two position relay operable by external input information signals, one pole being connected to the pole of said single pole relay and the other pole of said double pole relay being connected to the common junction of said serially connected first and second power sources, said phase winding having a capacitance connected in series therewith being connected to a normal position terminal of one pole and to the other position terminal of the other pole of said double pole relay, said series capacitance being connected to the remaining two position terminals of said double pole relay, whereby operation of said double pole, two position relay reverses the direction of output shaft rotation by reversing current flow through said phase winding having a series capacitance.

2. Apparatus in accordance with claim 1 wherein means for counteracting the undesirable effect of the capacitance of said parallel resistance-capacitance combination is connected across the other phase winding having said parallel resistance-capacitance combination connected in series therewith, said latter means including a resistance and series capacitance.

3. Means for a digital servomotor, comprising: a servomotor responsive to a pulse input thereto by a discrete and finite amount of output shaft rotation for each input pulse; a first and second D. C. power source, said D. C. power sources connected serially in additive polarity; a single pole, two position switching means, said serially connected first and second power sources connected across the two position terminals of said switching means, the pole of said switching means and the common junction of said serially connected first and second power sources being connected to said servomotor, whereby said servomotor is actuated by operation of the pole of said switching means momentarily from one position to the other and back to produce a pulse output of sufficient magnitude and width to drive said servomotor, said servomotor being normally locked in position by current provided by one of said power sources when the pole of said switching means is in a normal position, said servomotor being a two phase servomotor, one of the phase windings having a capacitance connected in series to provide a transient pulse of input voltage thereto, said series combination connected in parallel with the other phase winding.

4. Apparatus in accordance with claim 3 wherein means for cross-interchanging loads to one of said phase windings are provided, said latter means including a double pole, two position switch operated according to external input information, whereby the direction of output shaft rotation is controlled for each input pulse to said servomotor.

5. Apparatus in accordance with claim 3 wherein means for limiting the flow of rotor locking current is provided, said latter means including a parallel resistance-capacitance combination connected in series with said other phase winding.

References Cited in the file of this patent
UNITED STATES PATENTS

| | | |
|---|---|---|
| 843,287 | MacCoy | Feb. 5, 1907 |
| 2,402,928 | Summers | Jan. 25, 1946 |
| 2,461,566 | Morrill | Feb. 15, 1949 |
| 2,537,427 | Seid et al. | Jan. 9, 1951 |
| 2,596,711 | Mueller | May 13, 1952 |
| 2,630,552 | Johnson | Mar. 3, 1953 |
| 2,643,355 | Hallman | June 23, 1953 |
| 2,706,270 | Steele | Apr. 12, 1955 |